US007638475B2

(12) United States Patent
Dwiggins et al.

(10) Patent No.: US 7,638,475 B2
(45) Date of Patent: Dec. 29, 2009

(54) SPACE SAVING TOILET CLEANING SYSTEM

(75) Inventors: John H. Dwiggins, Neenah, WI (US); Lynn M. Daul, Appleton, WI (US); David W. White, Clintonville, WI (US); Joseph R. Pounder, Greenville, WI (US); Bruce J. Kokko, Neenah, WI (US); Sanjay Wahal, Appleton, WI (US); Phuong Van Luu, Appleton, WI (US); Gerald J. Van Handel, Neenah, WI (US); T. Philips Oriaran, Appleton, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 274 days.

(21) Appl. No.: 11/689,170

(22) Filed: Mar. 21, 2007

(65) Prior Publication Data

US 2007/0220690 A1 Sep. 27, 2007

Related U.S. Application Data

(60) Provisional application No. 60/785,748, filed on Mar. 24, 2006.

(51) Int. Cl.
*C11D 17/00* (2006.01)
*B32B 27/10* (2006.01)
*B32B 1/08* (2006.01)

(52) U.S. Cl. ....................... 510/439; 510/441; 510/438; 510/191; 510/193; 510/108; 510/109; 510/297; 428/36.9; 428/36.5; 428/36.4; 428/35.7; 428/34.3; 428/34.7; 428/34.9; 428/34.2

(58) Field of Classification Search ................. 510/441, 510/438, 439, 191, 193, 108, 109, 297; 428/36.9, 428/36.5, 36.4, 35.7, 34.2, 34.3, 34.7, 34.9
See application file for complete search history.

(56) References Cited

U.S. PATENT DOCUMENTS 1,761,111 A 6/1930 Doty (Continued)

FOREIGN PATENT DOCUMENTS

DE 1650135 8/1970

(Continued)

OTHER PUBLICATIONS

International Search Report and Written Opinion of the International Searching Authority dated Sep. 25, 2007 in connection with PCT/US07/64598.

*Primary Examiner*—Mark Eashoo
*Assistant Examiner*—Jane L Stanley
(74) *Attorney, Agent, or Firm*—Joel T. Charlton

(57) ABSTRACT

A cleaning system having pulverulent foaming cleanser (e.g., acid, alkali metal carbonate and surfactant) is sealed within a water soluble (e.g., PVOH) deformable pouch frictionally retainable within the core of a roll of bath tissue. Upon placement of the pouch in the bowl, water in the bowl penetrates the water soluble wall of the pouch, generating foam which provides cleaning action by activating and carrying cleansing chemicals, not only below the water line of the bowl, but also considerably above it. When used routinely with each change of bath tissue roll, such a cleaning can extend the time between required manual cleanings considerably.

3 Claims, 3 Drawing Sheets

U.S. PATENT DOCUMENTS

| | | | | | |
|---|---|---|---|---|---|
| 2,087,592 | A | * | 7/1937 | Chesnut | 510/195 |
| 2,539,395 | A | * | 1/1951 | Banks | 510/140 |
| 2,635,400 | A | * | 4/1953 | Abbott, Jr. et al. | 53/411 |
| 2,636,007 | A | * | 4/1953 | Jurgensen et al. | 510/140 |
| 2,728,604 | A | * | 12/1955 | Garfield | 242/599.2 |
| 3,128,287 | A | | 4/1964 | Berg | |
| 3,159,581 | A | | 12/1964 | Diehl | |
| 3,213,030 | A | | 10/1965 | Diehl | |
| 3,308,067 | A | | 3/1967 | Diehl | |
| 3,400,148 | A | | 9/1968 | Quimby | |
| 3,422,021 | A | | 1/1969 | Roy | |
| 3,422,137 | A | | 1/1969 | Quimby | |
| 3,581,744 | A | | 6/1971 | Voss et al | |
| 3,635,830 | A | | 1/1972 | Lamberti et al | |
| 3,723,322 | A | | 3/1973 | Diehl | |
| 3,771,883 | A | * | 11/1973 | Terepin | 401/123 |
| 3,923,679 | A | | 12/1975 | Rapko | |
| 4,102,903 | A | | 7/1978 | Crutchfield et al. | |
| 4,120,874 | A | | 10/1978 | Crutchfield et al. | |
| 4,144,226 | A | | 3/1979 | Crutchfield et al. | |
| 4,158,635 | A | | 6/1979 | Crutchfield et al. | |
| 4,279,768 | A | | 7/1981 | Busch | |
| 4,566,984 | A | | 1/1986 | Bush | |
| 4,663,071 | A | | 5/1987 | Bush et al. | |
| 4,762,738 | A | | 8/1988 | Keyes et al. | |
| 5,272,191 | A | | 12/1993 | Ibrahim et al. | |
| 5,384,364 | A | | 1/1995 | Besse et al. | |
| 5,471,697 | A | | 12/1995 | Daconta | |
| 5,543,309 | A | * | 8/1996 | Pischel | 435/177 |
| 5,578,562 | A | | 11/1996 | Lockhart | |
| 5,686,402 | A | * | 11/1997 | Gutierrez et al. | 510/361 |
| 6,045,745 | A | | 4/2000 | Reno | |
| 6,153,572 | A | | 11/2000 | Stamm | |
| 6,255,267 | B1 | | 7/2001 | Nayar et al. | |
| 6,284,359 | B1 | | 9/2001 | Rose et al. | |
| 6,583,103 | B1 | | 6/2003 | Klinkhammer | |
| 6,808,776 | B2 | | 10/2004 | Mientus et al. | |
| 6,833,340 | B2 | | 12/2004 | Lefenfeld et al. | |
| 6,846,531 | B2 | | 1/2005 | Mientus et al. | |
| 6,946,501 | B2 | | 9/2005 | Kochvar et al. | |
| 7,488,520 | B2 | * | 2/2009 | Urlaub et al. | 428/34.1 |
| 2002/0040213 | A1 | | 4/2002 | Tweddell, III et al. | |
| 2002/0065363 | A1 | | 5/2002 | Wang et al. | |
| 2003/0012969 | A1 | | 1/2003 | Clark | |
| 2003/0050210 | A1 | * | 3/2003 | Pounds et al. | 510/297 |
| 2003/0114333 | A1 | * | 6/2003 | Somerville-Roberts et al. | 510/297 |
| 2003/0132330 | A1 | | 7/2003 | Kubota et al. | |
| 2004/0077513 | A1 | | 4/2004 | Lefenfeld et al. | |
| 2004/0159730 | A1 | | 8/2004 | Kubota et al. | |
| 2005/0005378 | A1 | | 1/2005 | Soller et al. | |
| 2005/0067095 | A1 | | 3/2005 | Hasenoehrl et al. | |
| 2005/0069665 | A1 | | 3/2005 | Butler, III | |
| 2007/0044928 | A1 | * | 3/2007 | Shannon et al. | 162/109 |
| 2007/0044930 | A1 | | 3/2007 | Vinson et al. | |
| 2007/0048474 | A1 | | 3/2007 | Butler, III et al. | |
| 2007/0167340 | A1 | | 7/2007 | Barthel et al. | |
| 2009/0142224 | A1 | * | 6/2009 | Urlaub et al. | 422/5 |

FOREIGN PATENT DOCUMENTS

| | | | | |
|---|---|---|---|---|
| GB | 2202750 | A | | 10/1998 |
| GB | 2361687 | A | | 10/2001 |
| GB | 2401870 | A | | 11/2004 |
| JP | 1994192577 | A | | 7/1994 |
| JP | 07303348 | | | 5/1997 |
| JP | 409118478 | A | | 5/1997 |
| JP | 410085155 | A | | 4/1998 |
| WO | 9609789 | A1 | | 4/1996 |
| WO | 0044982 | A1 | | 8/2000 |
| WO | 0183668 | A1 | | 11/2001 |
| WO | 0247998 | A1 | | 6/2002 |
| WO | WO 02/47998 | A1 | * | 6/2002 |
| WO | 2005030475 | A1 | | 4/2005 |
| WO | 2006000309 | A1 | | 1/2006 |

* cited by examiner

SPACE SAVING TOILET CLEANING SYSTEM

This application is based upon U.S. Provisional Patent Application No. 60/785,748 of the same title filed Mar. 24, 2006. The priority of U.S. Patent Application No. 60/785,748 is hereby claimed and its disclosure incorporated herein by reference.

Toilet cleaning has to be one of the most disagreeable household cleaning tasks. This invention is directed to a cleaning system wherein pulverulent foaming cleanser is sealed within a water soluble deformable pouch sized to be frictionally retained within the core of a roll of bath tissue. Accordingly, toilet cleaning can be made routine and automatic—when a roll of bath tissue requires changing, the pouch in the new roll may be removed and tossed in the bowl. After the water in the bowl penetrates the water soluble wall of the pouch, foam generated provides cleaning action by activating and carrying cleansing chemicals, not only below the water line of the bowl, but also considerably above it. When used routinely with each change of bath tissue roll, such a cleaning can extend the time between required manual cleanings considerably.

Optionally, a compressed mildly acidic non-foaming cleaning tablet may also be disposed within the roll core to be deposited into the tank providing continuous cleaning action between roll changes. As the cleaning tablet of the present invention is meant to be deposited in the tank, only a low degree of foaming action, if any, is desirable as there is far less head space in the tank and less need to clean more than a fraction of an inch above the water line.

DESCRIPTION OF THE PREFERRED EMBODIMENTS

Figure 4:
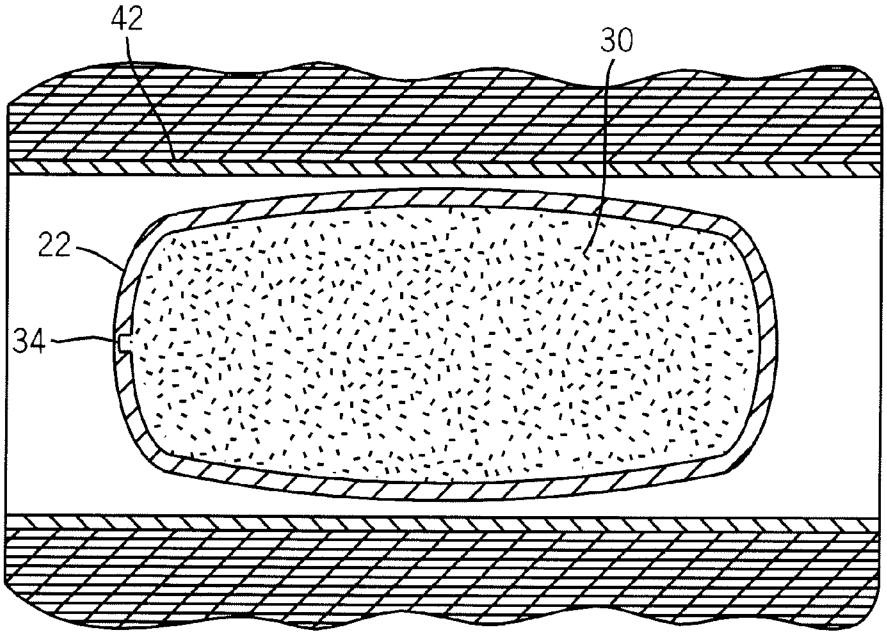
FIG. 4 is a schematic cross-section illustrating the pouch as it is frictionally retained within the core of its associated roll of bath tissue.
Figure 5:
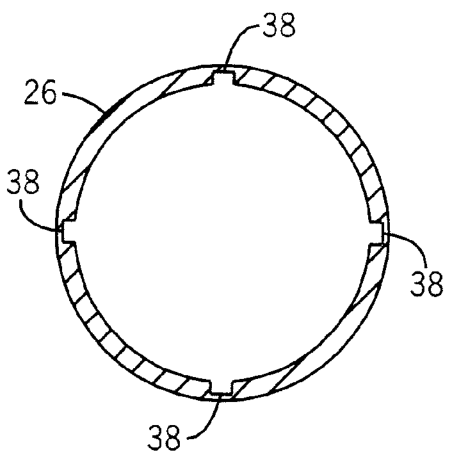
FIG. 5 is a schematic cross-section taken along line 5-5 in FIG. 2.

In FIGS. 1 through 7, deformable pouch 22, of an unrestrained diameter sized to be frictionally retained in a tissue core of between about 1.5" and about 1.75" and having a length of between about 1.5" and 4.5", has outer flexible film 26 of water soluble polymer encapsulating pulverulent foaming cleanser 30 therewithin. Over most of the surface of pouch 22, the thickness of outer film 26 is between about 0.001" and about 0.005" to provide a rugged shell for retention of pulverulent foaming cleanser 30 therewithin. At weak point 34, the thickness of outer film 26 is considerably thinner than over the rest of the pouch, ranging from about 0.0003" to about 0.0005" or perhaps 25 to 50% of the thickness of the thicker portions of outer film 26. In some cases as illustrated in FIG. 5, it will be desirable to additionally provide veins of weakness 38 having a depth of between about 25% and 75% of the thickness of outer film 26 so that upon initial entry of water through weak point 34, the pressure of gas generated within pouch 22 can rupture outer film 26 along veins of weakness 38 leading to more rapid dissolution of pulverulent foaming cleanser 30 within pouch 22. Accordingly, when the polymeric film 26 at weak point 34 is first dissolved, entry of water into pouch 22 triggers foaming, thereby generating gas, the pressure of which causes pouch 22 to rupture along veins of weakness 38 facilitating further entry of water into the interior of pouch 22 which aids in dissolution of pulverulent foaming cleanser 30 and exposing both sides of film 26 to the bulk of the water still further enhancing foaming of the cleanser along with dissolution of outer film 26. Desirably, the size of weak point 34 will vary between about 0.05" and about 0.2", while veins of weakness 38 will have a width of between about 0.03" and 0.15". Any convenient shape may be utilized, with preference to shapes that aid in “unzipping” the water soluble film rapidly such as longitudinally extending veins 38 radiating from point of weakness 34.

Figure 1:
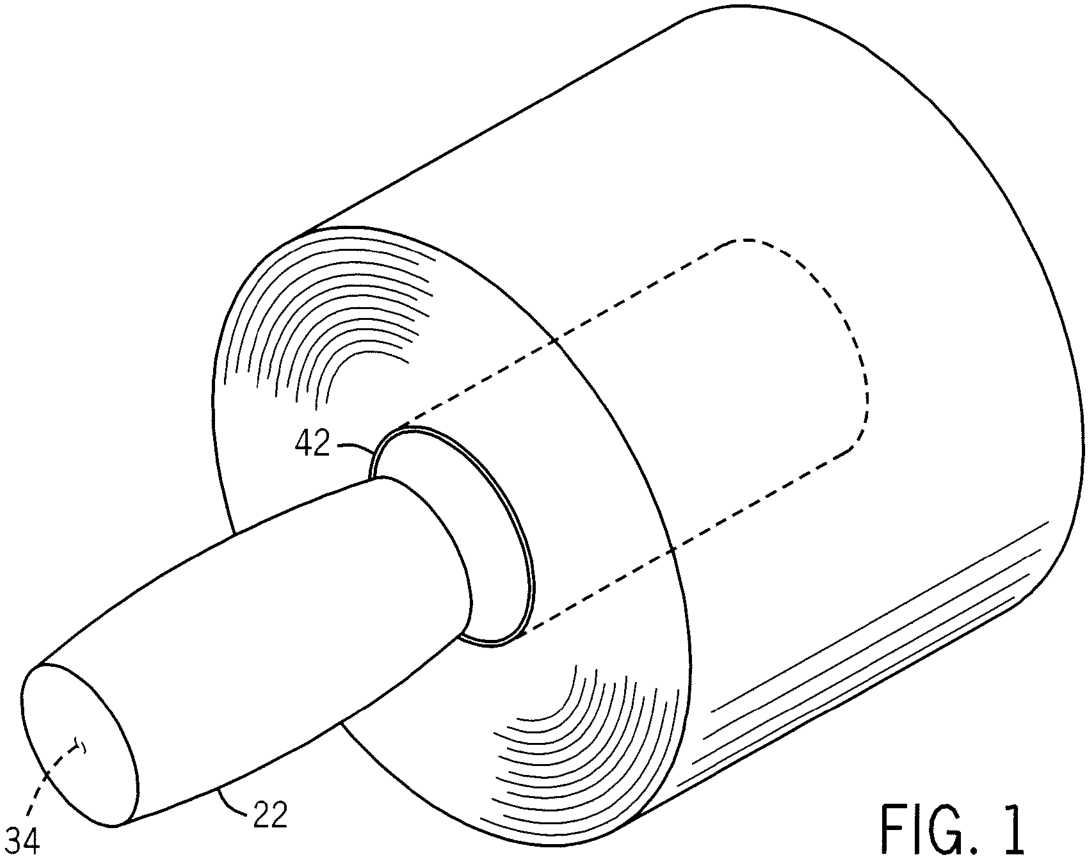
FIG. 1 is a schematic isometric perspective illustrating the pouch as it is removed from its associated roll of bath tissue.
Figure 2:
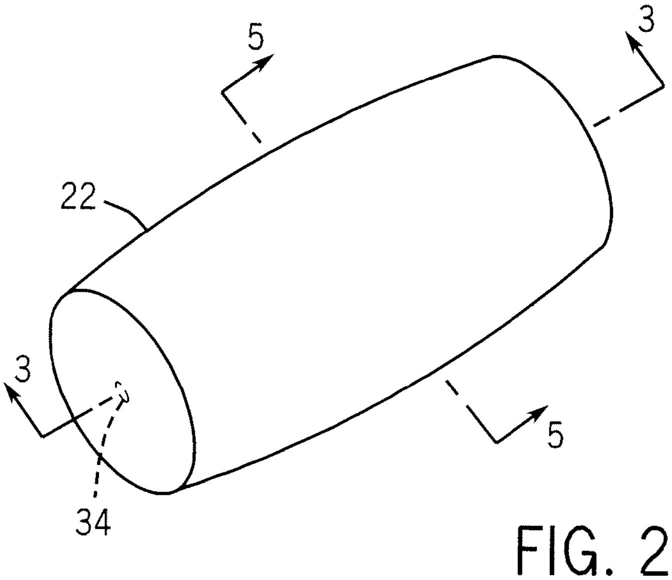
FIG. 2 is a schematic isometric perspective of a pouch of the present invention.
Figure 3:
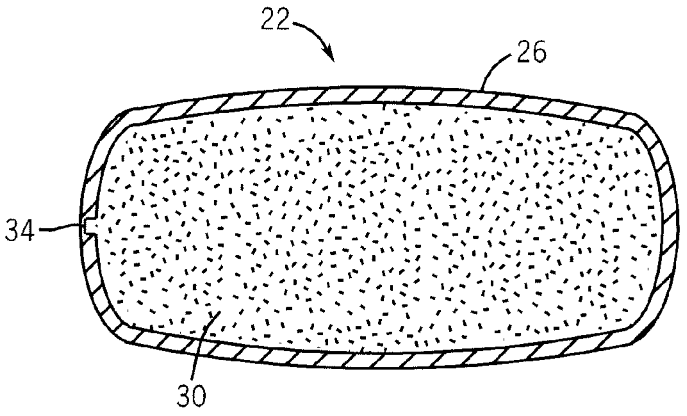
FIG. 3 is a schematic cross-section of the pouch of the present invention taken along line 3-3 in FIG. 2.
Figure 6:
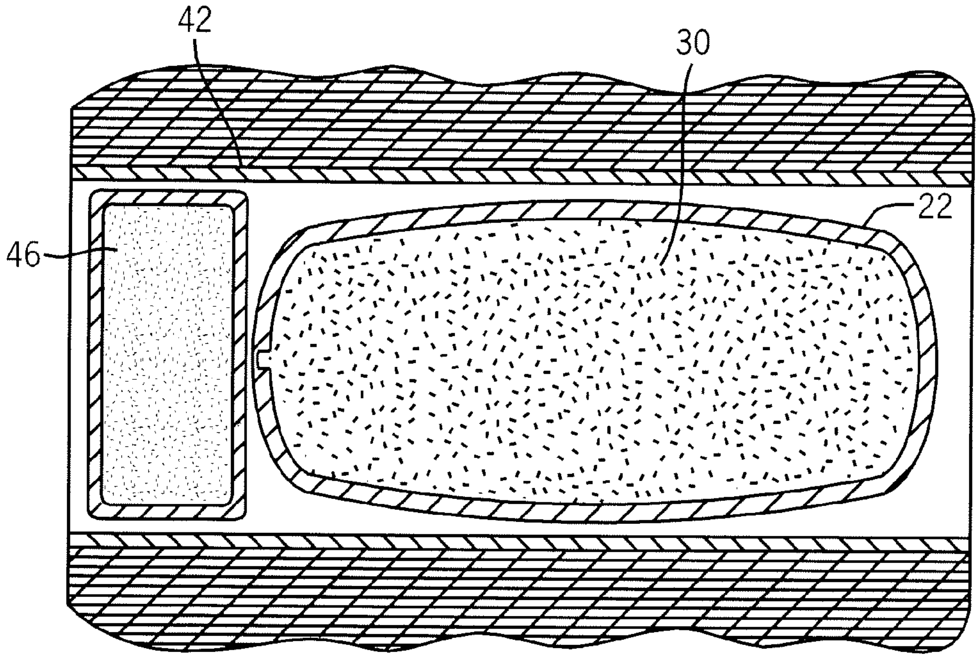
FIG. 6 is a schematic cross-section of another embodiment in which a mildly acidic non-foaming, or low foaming, cleaning tablet is additionally included to be placed in the tank.
Figure 7:
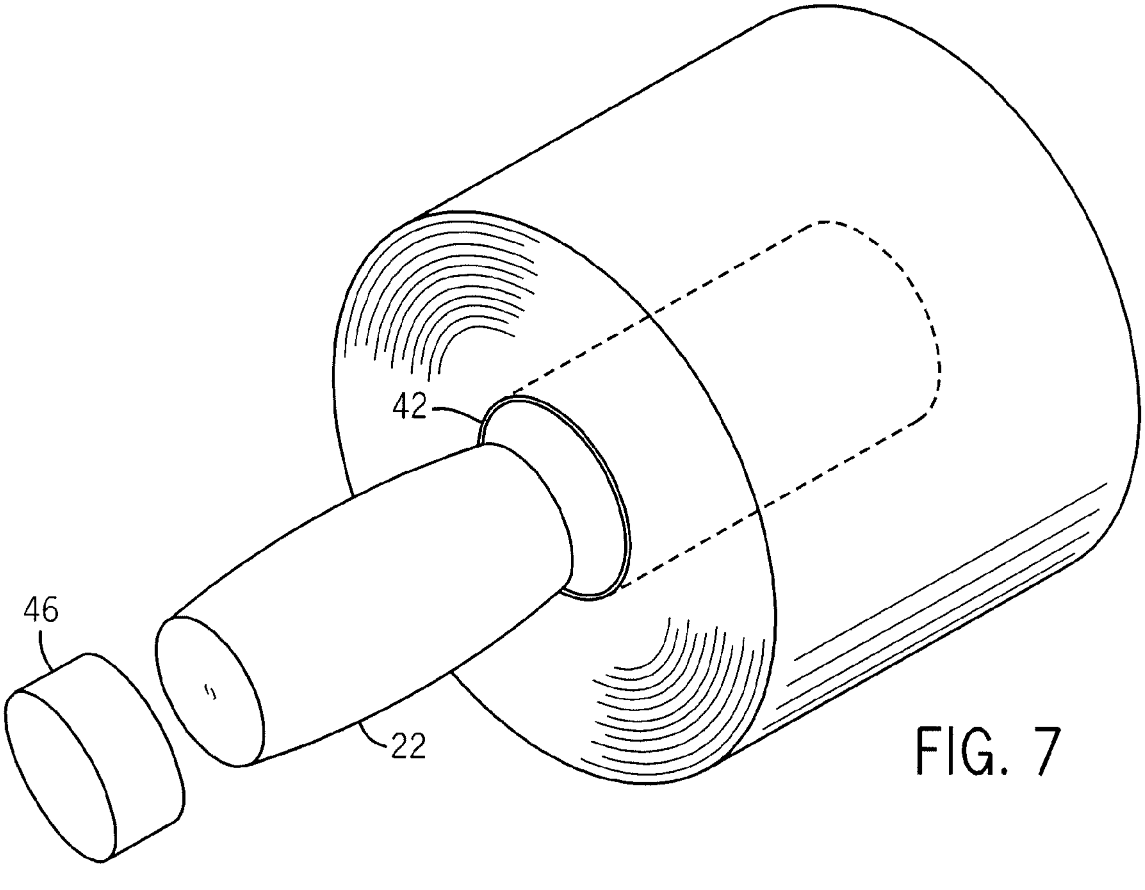
FIG. 7 is a schematic isometric perspective of an ensemble of a cleaning pouch and cleaning tablet of the present invention upon removal from the core of a roll of tissue.

The unrestrained diameter of the cleaning pouch should only very slightly exceed the inner diameter of the core 42 in which it is to be placed so that, as shown in FIGS. 1 and 4, when it is deformed slightly to fit within the core, frictional forces will inhibit movement of the pouch without unduly hindering removal of the pouch from the core. Similarly, if a tank cleaning tablet 46 such as that shown in FIG. 7 is included, its diameter should closely approximate the inner diameter of the core as shown in FIG. 6. In some cases, the core itself may be formed by consolidating several layers of water dispersible tissue into a cylindrical shell using a water soluble starch. In such cases, the cleaning pouch may be fixed in place within the core and the core and pouch together tossed into the bowl when the roll of tissue is exhausted.

The pulverulent foaming cleanser comprises:

a mild water soluble acidic pulverulent solid;

a gas evolving basic pulverulent solid; and a foaming surfactant.

In certain embodiments, bubbles result from the formation of carbon dioxide. For instance, when added to a liquid, such as water, a mixture of at least one acid and at least one base results in a chemical reaction that liberates carbon dioxide. In one aspect, both the acid and the base may be in anhydrous form. Preferably, the pulverulent foaming cleanser may also contain a desiccant, an anti-caking adjuvant, and/or an ingestion inhibiting dis-flavorant. It may also be desirable to incorporate ingestion inhibiting dis-flavorant into the water soluble outer film.

Examples of acids suitable for use include, but are not limited to, tartaric acid, citric acid, fumaric acid, adipic acid, malic acid, oxalic acid, gluconic acid or sulfamic acid, either alone or in combination. Typically, the pulverulent foaming cleanser of this invention will be prepared from gluconic acid, tartaric acid, or citric acid or a combination of thereof.

Examples of preferred gas evolving basic solids suitable for use in the pulverulent foaming cleansers of the present invention are generally compounds generating carbon dioxide upon reaction with acid including but not limited to, alkali metal salts such as potassium carbonate, sodium carbonate, sodium bicarbonate, and alkali earth salts such as calcium carbonate, magnesium carbonate and calcium bicarbonate, as well as other salts like ammonium carbonate. The most preferred gas evolving basic solid is sodium bicarbonate.

Surfactants suitable for use in the pulverulent foaming cleanser of the present invention include detersive surfactants selected from the group consisting of anionic, cationic, nonionic, zwitterionic, amphoteric surfactants and mixtures thereof, with nonionic surfactants being preferred due to their enhanced performance with hard water.

Anionic surfactants are also particularly useful, since such surfactants are capable of forming a thick foam or lather during liberation of carbon dioxide by the powdered foaming cleanser.

Examples of suitable surfactants include, but are not limited to sodium lauryl sulfonate, sodium alpha olefin sulfonate, alkyl benzene sulfonate, sodium dodecyl benzene sulphonate as well as the sulfate analogs of all the foregoing and cocoyl glutamic acid. Other types of surfactants include alkyl benzene sulfonates and sulfates, alkyl ether sulfonates and sulfates, paraffin sulfonates and sulfates, olefin sulfonates and sulfates, amine oxides, alkyl betaines and the like, which are known in the art.

Nonlimiting examples of surfactants which can be delivered by the articles of manufacture of the present invention or which can be combined in the present invention include:

C11-C18 alkyl benzene sulfates (LAS);
C6-C18 mid-chain branched aryl sulfates (BLAS);
C10-C20 primary, $\alpha$ or $\omega$-branched, and random alkyl sulfates (AS);
C14-C20 mid-chain branched alkyl sulfates (BAS);
C10-C18 secondary (2,3) alkyl sulfates;
C10-C18 alkyl alkoxy sulfates (AExS) wherein preferably x is from 1-7;
C14-C20 mid-chain branched alkyl alkoxy sulfates (BAExS);
C10-C18 alkyl alkoxy carboxylates preferably comprising 1-5 ethoxy units;
C12-C18 alkyl ethoxylates, C6-C12 alkyl phenol alkoxylates wherein the alkoxylate units are a mixture of ethylenoxy and propylenoxy units, C12-C18 alcohol and C6-C12 alkyl phenol condensates with ethylene oxide/propylene oxide block polymers;
C14-C22 mid-chain branched alkyl alkoxylates;
Alkylpolysaccharides; and
Polyhydroxy fatty acid amides.

Minor amounts of a solid water soluble disinfectant can also desirably be incorporated into the pulverulent foaming cleanser. Suitable disinfectants include: chlorhexidine, chlorhexidine gluconate, composition of potassium peroxymonosulfate/sulfamic acid/potassium persulfate, potassium peroxymonosulfate/sulfamic acid/sodium dodecylbenzene sulphonate, quaternary ammonium compounds such as alkyl aryl, benzyl, didecyl, dimethyl, ethylbenzyl, octyl or a combination of different ammonium chloride, benzalkonium chloride and benzethonium chloride in amounts of up to about 1%, most preferably between 0.05% and 0.5% based on the weight of the solids in the pulverulent foaming cleanser.

Disintegrators are substances which are incorporated into the surfactant granules to accelerate their disintegration on contact with water. Viewed macroscopically, the disintegrators may appear to be homogeneously distributed in the granules although, on a micro-scale, they form zones of increased concentration. Preferred disintegrators include polysaccharides such as, for example:

natural starch and derivatives thereof, (carboxymethyl starch, starch glycolates in the form of their alkali metal salts, agar agar, guar gum, pectins, etc.),
celluloses and derivatives thereof (carboxymethyl cellulose, particularly superabsorbent powders, microcrystalline cellulose), polyvinyl pyrrolidone, collodion, alginic acid, and alkali metal salts thereof (alginates),
amorphous or even partly crystalline layer silicates (bentonites),
polyurethanes,
polyethylene glycols and
effervescent systems.

To produce the granules according to the invention, the surfactants and the disintegrators may be used in a ratio by weight of 1:10 to 10:1, preferably 1:5 to 5:1 and more particularly 1:2 to 2:1, based on their solids contents. In addition, it is advisable to adjust the water content of the disintegrators or the surfactant granules to such a value that swelling does not automatically occur during storage. The residual water content should preferably not exceed 10% by weight. Preferably, the components of the foaming cleanser are thoroughly dried before incorporation into the pouch to control interactions between the cleanser and the soluble pouch.

Incorporation of a builder into the pulverulent foaming cleanser of the present invention can have dual advantage in terms both of the extent and duration of the foam generated as well as in lime control, addressing the lime scale often forming at the water line. Builders may include:

carbonate builders;
aluminosilicate builders;
polycarboxylate builders; and
phosphonate builders.

Examples of carbonate builders include alkaline earth and alkali metal carbonates.

Aluminosilicate builders include molecular sieves; Zeolite A, Zeolite P (B), Zeolite MAP and Zeolite X. In one embodiment, the crystalline aluminosilicate ion exchange material is Zeolite A. Preferably, the aluminosilicate has a particle size of about 0.1-10 microns in diameter. The alumino-silicate builders are especially preferred due to their ability to attract and retain metals thus helping to address scale buildup.

Included among the polycarboxylate builders are those disclosed in U.S. Pat. No. 3,128,287 Berg, issued Apr. 7, 1964, and U.S. Pat. No. 3,635,830 Lamberti et al., issued Jan. 18, 1972; U.S. Pat. No. 4,663,071 Bush et al., issued May 5, 1987; U.S. Pat. No. 3,923,679 Rapko, issued Dec. 2, 1975; U.S. Pat. No. 4,158,635 Crutchfield et al., issued Jun. 19, 1979; U.S. Pat. No. 4,120,874 Crutchfield et al., issued Oct. 17, 1978; and U.S. Pat. No. 4,102,903 Crutchfield et al., issued Jul. 25, 1978; all of which are incorporated herein by reference.

Other suitable builders are disclosed in U.S. Pat. No. 4,566,984, Bush, issued Jan. 28, 1986; U.S. Pat. No. 4,144,226, Crutchfield et al., issued Mar. 13, 1979; and in U.S. Pat. No. 3,308,067, Diehl, issued Mar. 7, 1967 and U.S. Pat. No. 3,723,322, Diehl, issued Mar. 27, 1973, incorporated herein by reference. Phosphonate builders such as ethane-1-hydroxy-1,1-diphosphonate and other known phosphonates as described in U.S. Pat. Nos. 3,159,581; 3,213,030; 3,422,021; 3,400,148 and 3,422,137 incorporated herein by reference.

An absorbing agent, or desiccant, may also be added to the pulverulent foaming cleanser of the present invention, in an amount of about 0.1% to about 10% by weight of the powdered foaming cleanser. The absorbing agent is useful for taking up moisture that may come into contact with the pulverulent foaming cleanser, thereby preventing the premature reaction between the acid and carbonate or bicarbonate components. The absorbing agent is typically a compound comprising silica (silicon dioxide). Examples of such absorbing agents, include but are not limited to: activated silica gel, amorphous silica, fumed silica, synthetic silica, anhydrous magnesium sulfate and anhydrous calcium sulfate.

The polymeric film forming the skin of the pouch may be a water-soluble polymer having a preferred molecular weight of, but not limited to, 50,000 to 700,000. In general, lower molecular weights are preferred as leading to faster dissolution. Suitable polymers include: water soluble polymers, sugars, gelatin and glycerins, possibly incorporating ionic species such as salts. It is contemplated that the polymeric film may contain ingredients as fillers to aid in promoting the rate of the polymers' dissolution in water. The present invention is innocuous towards plumbing.

The polymeric film is preferably constructed of water-soluble polymers (synthetic, semi-synthetic, and natural polymers) including, but not limited to, polyvinyl alcohol (PVOH) polymers, polyvinylacetate (PVA), polyvinylpyrrolidone (PVP), poly-(2-ethyl-2-oxazoline), polyethyleneoxide; methylhydroxypropyl cellulose; acrylamide polymers as well as mixtures and copolymers thereof. The highly soluble polymer desirably dissolves quickly to expose pulverulent foaming cleanser in the interior of the pouch to water contained in the bowl while at the same time protecting the pulverulent foaming cleanser from atmospheric moisture prior to use. The exterior polymer layer also protects the user's skin from the powdered foaming cleanser and active ingredients held therein.

The solubility and dissolution rate of the polymeric film are dependent primarily upon its composition, chemical structure, molecular weight, thickness and additives. Hence, in a preferred embodiment of the present invention, the thickness of the polymeric film will be set in manufacture to be thick enough to resist puncture, but thin enough to dissolve in from several seconds to at most a few minutes.

The preferred embodiment is a polymer layer approaching or exceeding 0.001" in thickness, although other embodiments are possible. Some embodiments of the present invention have dis-flavorants incorporated in or surrounding the external polymer layer. The goal for the dis-flavorants is to ensure that the present invention tastes extremely unsavory in case of accidental ingestion by a person or pet, so that the person or pet would be strongly inclined to remove the present invention from inside their mouth as quickly as possible. These dis-flavorants may include, but are not limited to, tannins, peppers, and alum ($KAl(SO_4)_2.12H_2O$).

A preferred cleaning pouch of the present invention will include 25 to 100 grams of pulverulent foaming cleanser, comprising:

40-60% sodium bicarbonate;

40-60% citric acid;

0.1 to 1.0% high-foaming anionic alkylsulfosuccinate surfactant;

0.1 to 1% kaolin clay; and 0.1 to 1% tetrapotassium pyrophosphate;

in a pouch of polyvinyl alcohol having a wall thickness of between about 0.001" and 0.003", with a preferred value of about 0.002" (0.005 cm or 2 mils) over the major part of its surface with a weak point having a diameter of between about 0.005" and 0.2" having a thickness of between about 0.0003" to about 0.0005" or between about 25% and 75% of the wall thickness; and a plurality of veins of weakness extending from the point of weakness, the thickness of the veins of weakness being intermediate the thickness of the wall portions and the point of weakness.

In other embodiments, the selection of specific acids and/or bases and their proportions depends, at least in part, upon the requirements for the amount of carbon dioxide release. In some embodiments, the acid may be added in an amount of about 10% to about 60% by weight of the pulverulent foaming cleanser, while the salt may also be added in an amount of about 10% to 60% by weight of the pulverulent foaming cleanser. Preferably an excess of acid is included to aid in addressing scale, particularly that occurring near the waterline. For increased effectiveness against scale, chelants including ethylene diamine tetra acetic acid and/or nitrilotriacetate may be added as well preferably in the form of their sodium salts along with: corrosion inhibitors such as benzotriazole for copper, sodium gluconate for ferrous metals; oxygen scavengers such as sodium sulfite; and antiprecipitants. Such anti-scaling compositions are known from U.S. Pat. No. 4,279,768.

In those applications in which it is desired to also include a tank based cleaning tablet within the core, it will generally be preferable to compress the solid mild acid, surfactant, detergent, an optional alumino-silicate and a pressing aid into a compressed tablet, optionally coated with a water-soluble polymeric sheath. The amount of any optional base included should be carefully controlled to ensure that excessive foaming does not occur in the tank which has much smaller headspace than the bowl. However, a minimal degree of foaming can be desirable to aid in controlling build up at the water line inside the tank.

As our invention, we claim:

1. An ensemble for toilet hygiene comprising:

a) a paperboard core having an approximate length of between 4 and 5 inches;

b) a plurality of sheets of bath tissue wound around said paperboard core;

c) a deformable cleaning pouch retained within said core comprising i) a shell of water soluble polymer, said polymer being chosen from the group consisting of: polyvinyl alcohol; polyvinyl acetate; polyacrylamide; polyvinylpyrrolidone; polyethyleneoxide; poly(2-ethyl-2-oxazoline) or mixtures thereof;

ii) a pulverulent water soluble solid acid, chosen from the group consisting of citric acid, tartaric acid, fumaric acid, adipic acid, malic acid, oxalic acid, sulfamic acid and mixtures thereof disposed within said shell;

iii) an alkali metal carbonate pulverulent solid disposed within said shell and intermixed with said pulverulent water-soluble acid; and iv) a foaming non-ionic surfactant detergent.

2. The ensemble for toilet hygiene of claim 1 further comprising a compressed tablet comprising pulverulent water soluble solid acid, chosen from the group consisting of citric acid, tartaric acid, fumaric acid, adipic acid, malic acid, oxalic acid, sulfamic acid and mixtures thereof and a non-ionic surfactant detergent frictionally retained within said core.

3. An ensemble for toilet hygiene comprising:

a) a paperboard core having an approximate length of between 4 and 5 inches;

b) a plurality of sheets of bath tissue wound around said paperboard core;

c) a deformable cleaning pouch frictionally retained within said core, comprising a water soluble polymeric film, said pouch further comprising a pulverulent foaming cleanser disposed within said shell, said pulverulent foaming cleanser comprising:

d) a pulverulent water soluble acid;

e) a pulverulent base capable of generating carbon dioxide upon contact with acidic liquid;

a chelant; and g) a foaming detergent.

* * * * *